United States Patent
Ichihara

(10) Patent No.: US 11,018,351 B2
(45) Date of Patent: May 25, 2021

(54) SINGLE CELL STRUCTURE FOR FUEL CELL

(71) Applicant: NISSAN MOTOR CO., LTD., Yokohama (JP)

(72) Inventor: Keiji Ichihara, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 173 days.

(21) Appl. No.: 16/077,998

(22) PCT Filed: Oct. 17, 2016

(86) PCT No.: PCT/JP2016/080716
§ 371 (c)(1),
(2) Date: Aug. 14, 2018

(87) PCT Pub. No.: WO2017/141490
PCT Pub. Date: Aug. 24, 2017

(65) Prior Publication Data
US 2020/0028186 A1  Jan. 23, 2020

(30) Foreign Application Priority Data
Feb. 15, 2016 (JP) .............................. JP2016-025874

(51) Int. Cl.
*H01M 8/0258* (2016.01)
*H01M 8/0273* (2016.01)
(Continued)

(52) U.S. Cl.
CPC ....... *H01M 8/0258* (2013.01); *H01M 8/0273* (2013.01); *H01M 8/1004* (2013.01); *H01M 2008/1095* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,261,710 B1* | 7/2001 | Marianowski | ...... | H01M 8/0258 429/434 |
| 2010/0035122 A1* | 2/2010 | Yamamoto | ...... | H01M 8/0254 429/406 |

(Continued)

FOREIGN PATENT DOCUMENTS

| CN | 102484264 A | 5/2012 |
|---|---|---|
| JP | 2007-305325 A | 11/2007 |

(Continued)

OTHER PUBLICATIONS

Merriam-Webster Online Dictionary entry for "at" accessed at https://www.merriam-webster.com/dictionary/at on Mar. 30, 2020 (Year: 2020).*

*Primary Examiner* — Amanda J Barrow
(74) *Attorney, Agent, or Firm* — Foley & Lardner LLP

(57) ABSTRACT

A single cell structure for a fuel cell includes: a framed membrane electrode assembly; a pair of separators disposed on both sides of the framed membrane electrode assembly; a gas channel portion which is formed between one of the pair of separators and the membrane electrode assembly, and to which gas is supplied; a manifold portion having a hole that penetrates the frame and the separator in a stacking direction; a protrusion that protrudes from at least one of the pair of separators toward the framed membrane electrode assembly to support the frame near the manifold portion; an extended portion of the frame that extends toward the manifold portion beyond the protrusion; and a gas flowing portion that is formed at the extended portion to supply the gas from the manifold portion to the gas channel portion. The gas flowing portion includes a bump that is disposed at the extended portion of the frame.

9 Claims, 18 Drawing Sheets

(51) Int. Cl.
*H01M 8/1004* (2016.01)
*H01M 8/1018* (2016.01)

(56) References Cited

U.S. PATENT DOCUMENTS

| | | | | |
|---|---|---|---|---|
| 2010/0129694 | A1* | 5/2010 | Sugiura | H01M 8/026 |
| | | | | 429/483 |
| 2011/0207018 | A1 | 8/2011 | Nakagawa et al. | |
| 2012/0156584 | A1 | 6/2012 | Uehara | |
| 2012/0321987 | A1* | 12/2012 | Goto | H01M 8/0263 |
| | | | | 429/480 |
| 2013/0071769 | A1* | 3/2013 | Ikezoe | H01M 8/0254 |
| | | | | 429/465 |
| 2013/0115541 | A1* | 5/2013 | Oku | H01M 8/0276 |
| | | | | 429/458 |
| 2013/0183606 | A1 | 7/2013 | Oku et al. | |
| 2016/0111746 | A1 | 4/2016 | Uehara | |

FOREIGN PATENT DOCUMENTS

| | | |
|---|---|---|
| JP | 2012-221619 A | 11/2012 |
| JP | 2013-098155 A | 5/2013 |
| WO | WO-2011/033745 A1 | 3/2011 |
| WO | WO-2011/158551 A1 | 12/2011 |

\* cited by examiner

SINGLE CELL STRUCTURE FOR FUEL CELL

TECHNICAL FIELD

The present invention relates to a single cell structure for a fuel cell.

BACKGROUND ART

A fuel cell which has been proposed allows forming a suitable coupling channel for reaction gas at a bridge with a simple component while securing a desired sealing function (see Patent Document 1).

The fuel cell includes a variety of sealers at the bridge between separators, which are made of ethylene-propylene-diene rubber, acrylonitrile-butadiene rubber or the like and integrated by baking, injection molding or the like.

CITATION LIST

Patent Document

Patent Document 1: JP 2013-98155A

SUMMARY OF INVENTION

Technical Problem

Along with an increasing demand for an improvement in the performance of fuel cells, components thereof such as a membrane electrode assembly, a gas diffusion layer and a frame have been getting thinner, and the spacing between separators of a single cell has also been getting narrower. In this regard, a gas flowing portion has a reduced height at the bridge in the fuel cell of Patent Document 1 since ends of the separators are covered with the variety of sealers. This increases the probability of increase in pressure loss.

The present invention has been made in view of the problem in the prior art. It is an object of the present invention to provide a single cell structure for a fuel cell that can suppress an increase in pressure loss even when the spacing between separators of a single cell is narrow.

Solution to Problem

The present inventor has conducted a keen study in order to achieve the above-described object. As a result, he found that the object can be achieved by providing a gas flowing portion with a bump in a predetermined position of a frame. The present invention was thus completed.

The single cell structure for a fuel cell of the present invention comprises a framed membrane electrode assembly, a pair of separators, a gas channel portion, a manifold portion, a protrusion, an extended portion of the frame and a gas flowing portion. The framed membrane electrode assembly comprises a membrane electrode assembly and a frame that supports an outer periphery of the membrane electrode assembly. The pair of separators are disposed on both sides of the framed membrane electrode assembly. The gas channel portion is formed between one of the pair of separators and the membrane electrode assembly, to which gas is supplied. The manifold portion has a hole that penetrates the frame and the separators in the stacking direction. The protrusion is formed such that at least one of the pair of separators protrudes toward the framed membrane electrode assembly, which supports the frame near the manifold portion. The extended portion of the frame extends toward the manifold portion beyond the protrusion. The gas flowing portion is formed at the extended portion of the frame to supply gas from the manifold portion to the gas channel portion. The gas flowing portion comprises a bump that is formed at the extended portion of the frame.

Advantageous Effects of Invention

With the present invention, it is possible to provide a single cell structure for a fuel cell that can suppress an increase in pressure loss even when the spacing between a pair of separators of the single cell is narrow.

DESCRIPTION OF EMBODIMENTS

Figure 1:
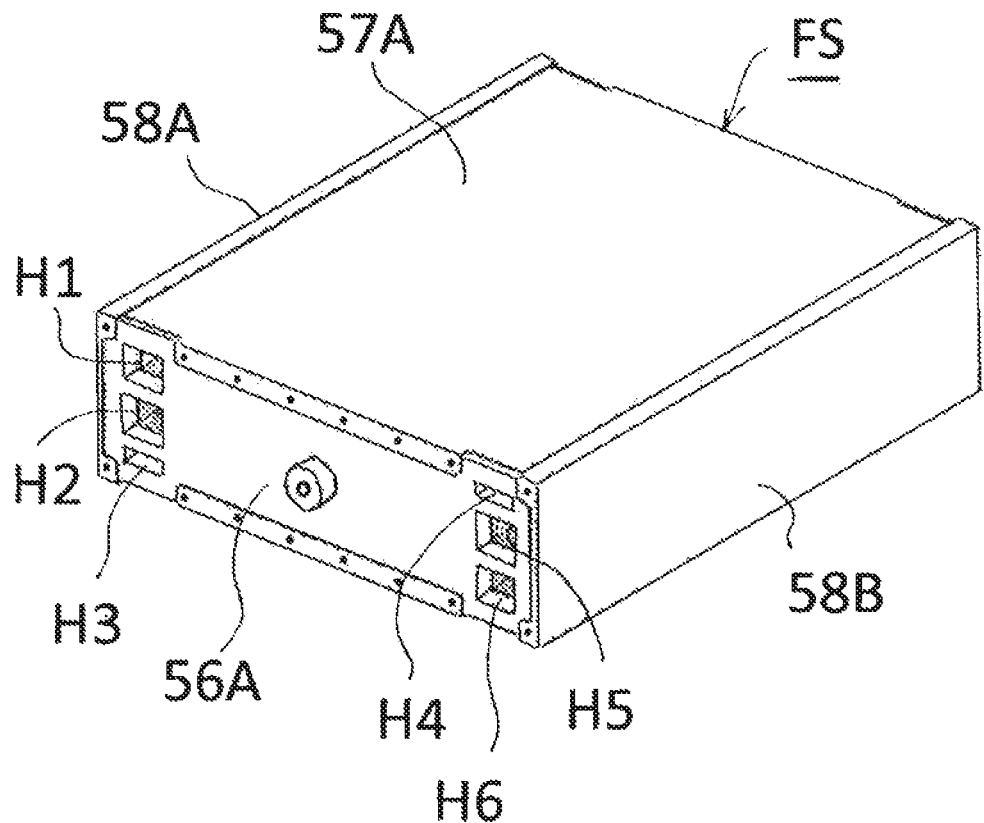
FIG. 1 is a perspective view of a fuel cell stack according to an embodiment of the present invention.

Hereinafter, a single cell structure for a fuel cell according to an embodiment of the present invention will be described in detail referring to the drawing. The dimension of the drawing referred to in the following embodiment is exaggerated for descriptive reasons and may be different from the actual dimension.

First Embodiment

Figure 2:
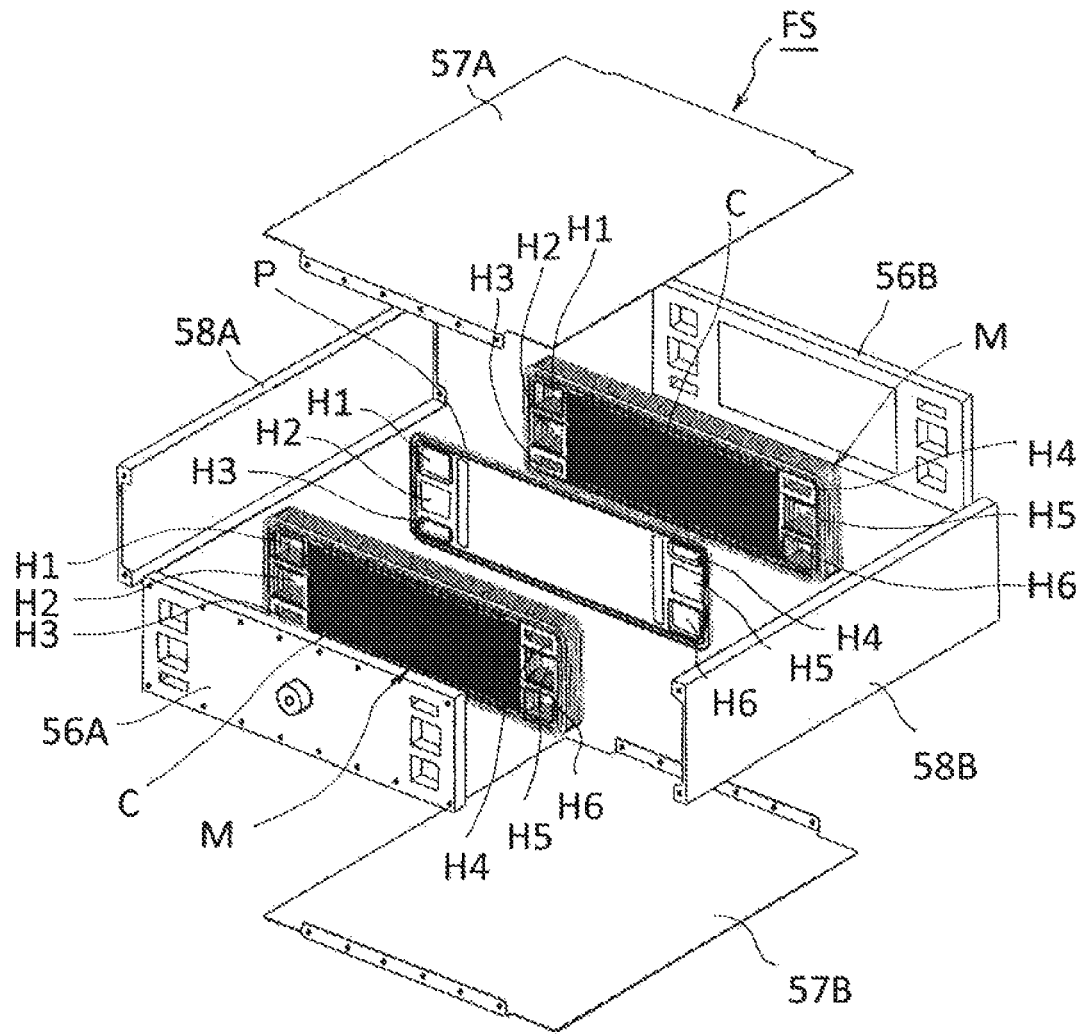
FIG. 2 is an exploded perspective view of the fuel cell stack according to the embodiment of the present invention.
Figure 3A:
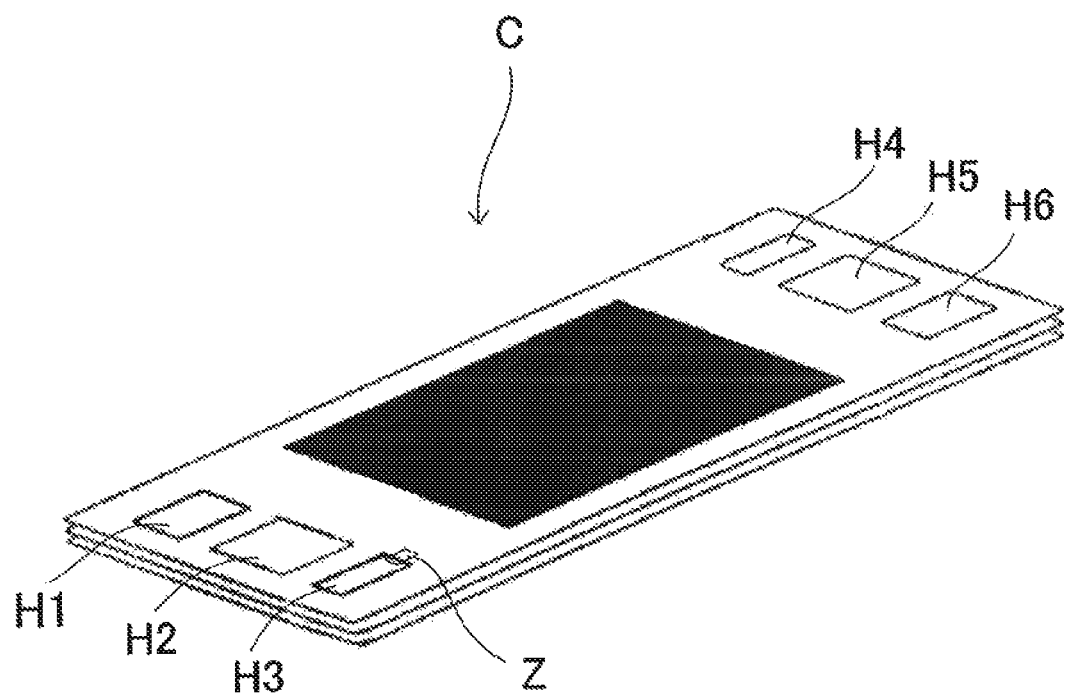
FIG. 3A is a perspective view of a fuel cell single cell.
Figure 3B:
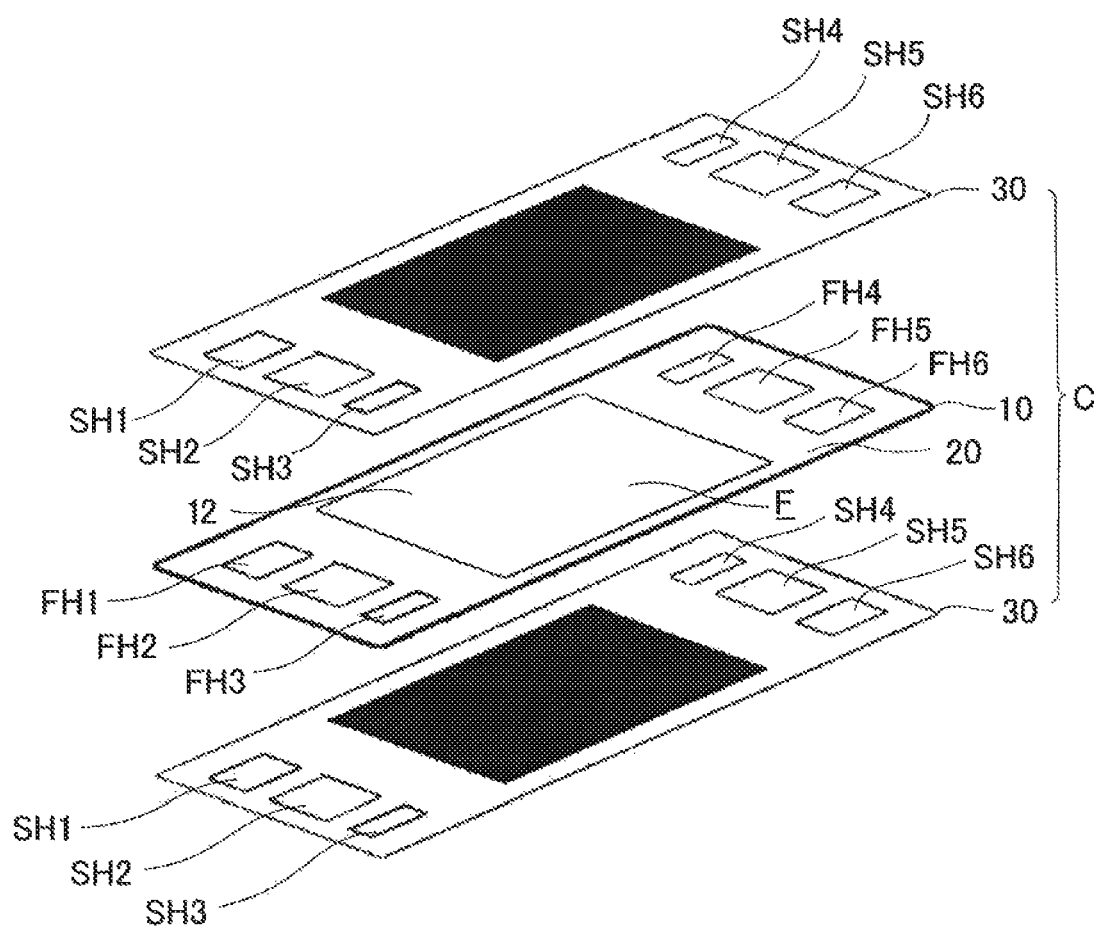
FIG. 3B is an exploded perspective view of the fuel cell single cell.

FIG. 1 is a perspective view of a fuel cell stack according to an embodiment of the present invention. FIG. 2 is an exploded perspective view of the fuel cell stack according to the embodiment of the present invention. FIG. 3A is a perspective view of a fuel cell single cell, and FIG. 3B is an exploded perspective view of the fuel cell single cell.

As illustrated in FIG. 1, FIG. 2, FIG. 3A and FIG. 3B, the fuel cell stack FS includes fuel cell modules M each including stacked and integrated fuel cell single cells, and a sealing plate P intervened between the fuel cell modules M. The fuel cell single cells C and the sealing plate P of the illustrated example have a rectangular plate shape with approximately the same length and width. While two fuel cell modules M and one sealing plate P are illustrated in FIG. 2, a larger number of fuel cell modules M and sealing plates P are actually stacked.

Further, the fuel cell stack FS includes end plates 56A, 56B disposed at the ends in the stacking direction of the fuel cell modules M, fastening plates 57A, 57B disposed on faces (top and bottom faces in FIG. 1 and FIG. 2) corresponding to the long sides of the fuel cell single cells C, and reinforcing plates 58A, 58B disposed on faces corresponding to the short sides. The fastening plates 57A, 57B and the reinforcing plates 58A, 58B are each coupled to both end plates 56A, 56B by bolts (not shown).

The fuel cell stack FS has such a case-integrated structure as illustrated in FIG. 1, which restrains and presses the fuel cell modules M and the sealing plates P in the stacking direction to apply a predetermined contact surface pressure to each of the fuel cell single cells C, so that the gas sealing property, the electrical conductivity and the like are maintained at high level.

As illustrated in FIG. 3A and FIG. 3B, each of the fuel cell single cells C includes a framed membrane electrode assembly 10 including a membrane electrode assembly 12 and a frame 20 supporting an outer periphery of the membrane electrode assembly 12, and a pair of separators 30, 30 disposed on both sides of the framed membrane electrode assembly 10 and manifold portions H1 to H6 having holes that penetrate the frame 20 and the separators 30 in the stacking direction. The fuel cell single cell further includes a gas channel portion F for supplying gas, which is formed between one of the separators 30 and the membrane electrode assembly 12.

The membrane electrode assembly 12, which is generally referred to as an MEA, includes an electrolyte membrane of a solid polymer that is held between a pair of electrode layers (anode, cathode), the detailed illustration is omitted though. The membrane electrode assembly 12 includes a resin frame 20 that is integrated at the periphery.

The separators 30 are metal plates in which the faces of one plate oppose the faces of the other plate. For example, the separators 30 are made of stainless steel and may be formed in any suitable shape by press working. The separators 30 have an uneven cross-sectional shape at least in the part facing the membrane electrode assembly 12. The separators 30 are in contact with the membrane electrode assembly 12 at protrusions and form gas channel portion F between recesses and the membrane electrode assembly 12.

As illustrated in FIG. 3A and FIG. 3B, each of the fuel cell single cells C includes manifold portions H1 to H3 and H4 to H6, which are arranged such that each short side has three manifold holes. The manifold portions H1 to H6 are formed in the frame 20 of the membrane electrode assembly 12 and in the separators 30 at the same position respectively as frame manifold portions FH1 to FH6 and separator manifold portions SH1 to SH6. They are communicated with corresponding manifold portions when the fuel cell single cell C is assembled.

The manifold portions H1 to H3 on the left in FIG. 3A are configured respectively to discharge the cathode gas (H1), to supply cooling fluid (H2) and to supply the anode gas (H3) from the top. These manifold portions are communicated with corresponding manifold portions in the stacking direction to form respective channels. The manifold portions H4 to H6 on the right in FIG. 3A are configured respectively to discharge the anode gas (H4), to discharge the cooling fluid (H5) and to supply the cathode gas (H6) from the top. These manifold portions are communicated with corresponding manifold portions in the stacking direction to form respective channels. The positional relationship of the manifold portions H1 to H6 may be partly or fully reversed in respect of supply and discharge.

A predetermined number of above-described fuel cell single cells C are stacked to form a fuel cell module M. In this regard, adjacent fuel cell single cells C form a channel for cooling fluid (e.g. water) therebetween, and adjacent fuel cell modules M also form a channel for cooling fluid therebetween. That is, the sealing plate P, which is disposed between the fuel cell modules M, is disposed in the channel for cooling fluid. The sealing plate P is formed as a separate component from the above-described fuel cell single cells C, which includes manifold portions H1 to H6 as with the fuel cell single cells C.

Figure 4:
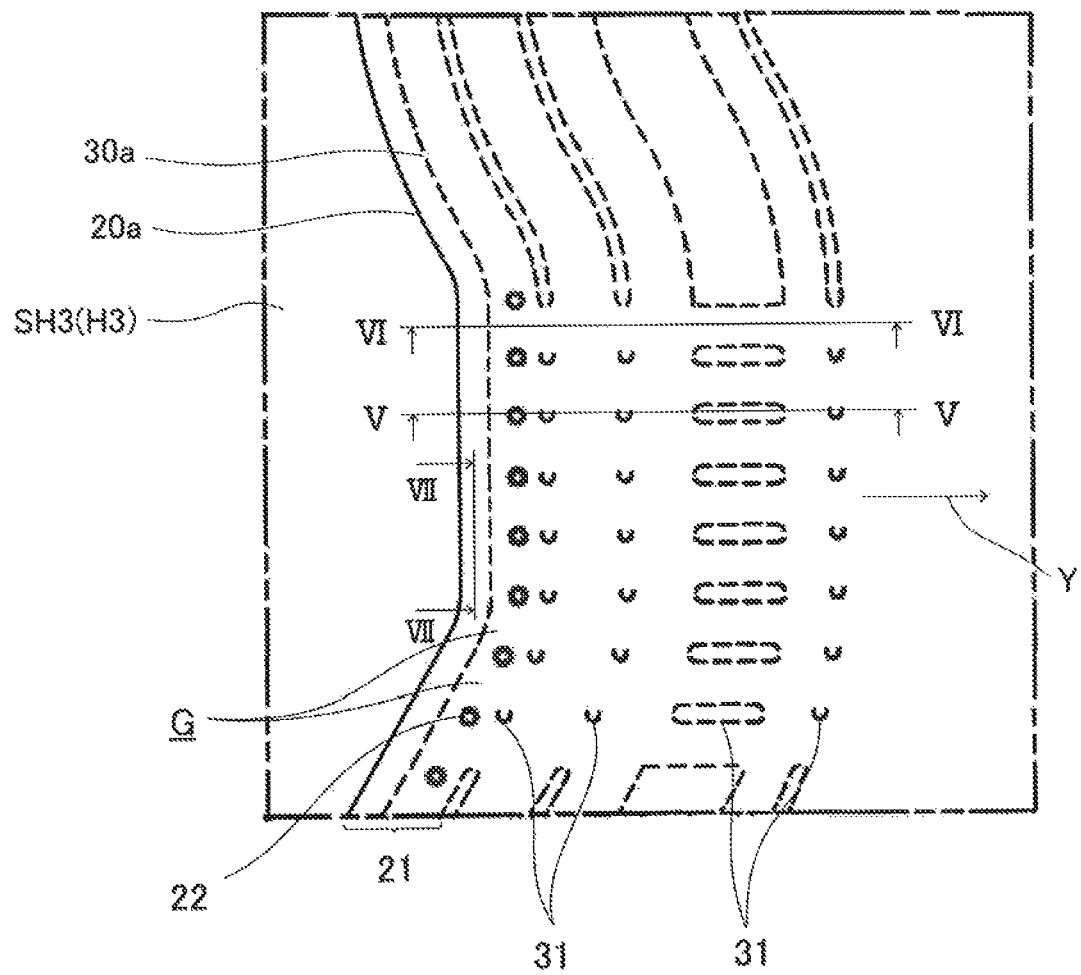
FIG. 4 is a plan view of a main part of the fuel cell single cell according to the first embodiment, which is a component of a fuel cell module.
Figure 5:
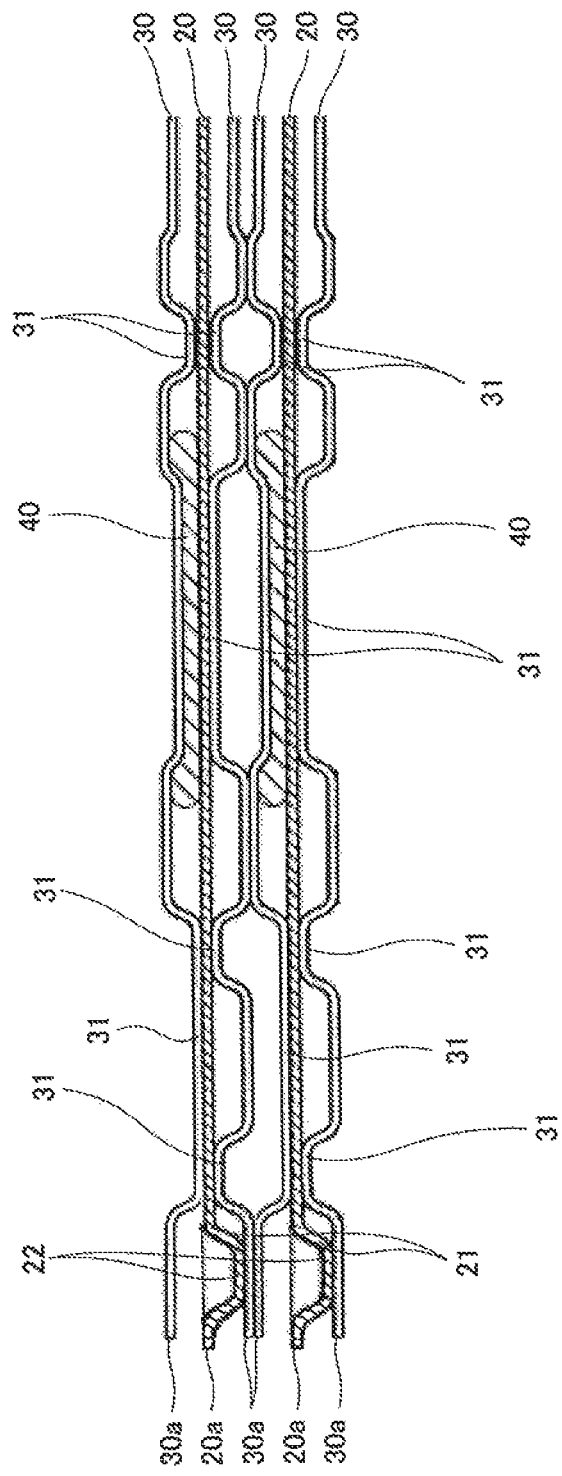
FIG. 5 is a cross-sectional view of the main part of the fuel cell single cell according to the first embodiment.
Figure 6:
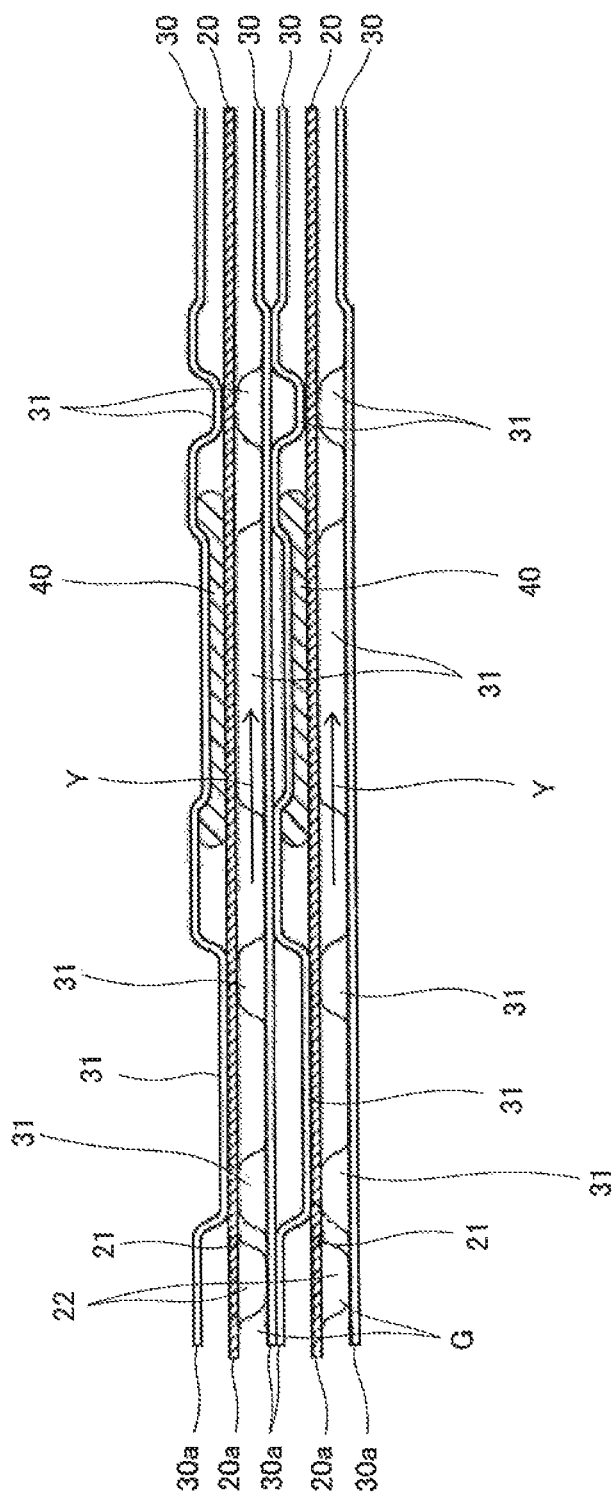
FIG. 6 is another cross-sectional view of the main part of the fuel cell single cell according to the first embodiment.
Figure 7:
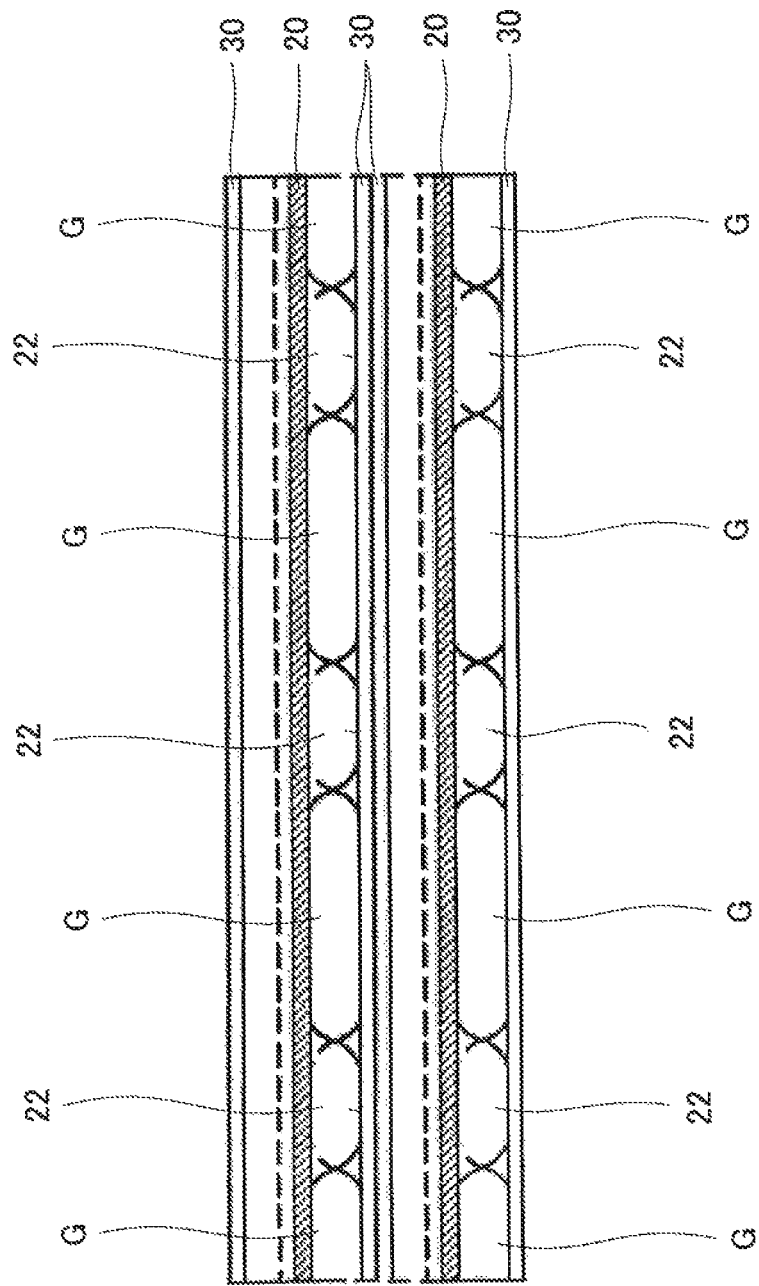
FIG. 7 is yet another cross-sectional view of the main part of the fuel cell single cell according to the first embodiment.

FIG. 4 is a plan view of a main part of the fuel cell single cell according to the first embodiment, which is a component of the fuel cell module. That is, FIG. 4 is a plan view of the part enclosed by the line Z of the fuel cell single cell in FIG. 3A. However, an upper separator of the pair of separators at the top of the fuel cell module is omitted. Further, a lower separator of the pair of separators at the bottom of the fuel cell module is illustrated by a dashed line. FIG. 5 is a cross-sectional view of the main part of the fuel cell single cell according to the first embodiment. That is, FIG. 5 is a cross-sectional view of the fuel cell single cell in FIG. 4 taken along the line V-V. However, FIG. 5 illustrates two fuel cell single cells that are stacked. FIG. 6 is another cross-sectional view of the main part of the fuel cell single cell according to the first embodiment. That is, FIG. 6 is a cross-sectional view of the fuel cell single cell in FIG. 4 taken along the line VI-VI. FIG. 7 is yet another cross-sectional view of the main part of the fuel cell single cell according to the first embodiment in FIG. 4. That is, FIG. 7 is a cross-sectional view of the fuel cell single cell in FIG. 4 taken along the line VII-VII. The same reference signs are denoted to the same components as those described above, and the description thereof is omitted.

As illustrated in FIG. 4 to FIG. 7, the pair of separators 30, 30, include protrusions 31 that protrude toward the framed membrane electrode assembly 10 and support the frame 20 near the manifold portion H3, wherein as illustrated, the protrusions 31 directly contact the frame 20. The frame 20 includes an extended portion 21 that extends toward the manifold portion H3 beyond the protrusions 31. The fuel cell single cell C includes a gas flowing portion G for supplying gas from the manifold portion H3 to the gas channel portion. The gas flowing portion G includes bumps 22 that are formed at the extended portion 21.

In the embodiment, the bumps 22 protrude toward one of the pair of separators 30, 30. The illustrated bumps 22 have an approximately circular shape in a plan view. For example, such bumps 22 can be formed by embossing. In this case, such bumps 22 form recesses on the side opposed to the other of the pair of separators 30, 30. The bumps 22 are in contact with one of the pair of separators 30, 30. Further, the bumps 22 are aligned with the protrusions 31 in the gas flow direction.

The opened end face 20a of the frame manifold portion FH3 (H3) protrudes inward to the separator manifold portions SH3 (H3) beyond the opened end face 30a of the separator manifold portions SH3 (H3).

The arrows Y in the figures show the gas flow direction. The gaps between the separators 30 and the frame 20 are partly sealed with a sealing member 40. The anode gas supplied through the manifold portion H3 flows through the gas flowing portion G formed between the bumps 22 as illustrated in FIG. 7 and further through a gas channel formed between the frame 20 and the lower separator 30 as illustrated in FIG. 6.

In the embodiment, the gas flowing portion includes the bumps disposed at the extended portion. This can secure the gas channel even when the frame is deformed. Therefore, even when the spacing between the separators of the single cell is narrow, an increase in pressure loss can be suppressed regardless of whether the frame is deformed.

In the embodiment, the bumps are aligned with the protrusions in the gas flow direction. This can secure the gas channel that causes less pressure loss compared to the case in which the bumps are not aligned with the protrusions. Therefore, even when the spacing between the separators of the single cell is narrow, an increase in pressure loss can be suppressed regardless of whether the frame is deformed. Further, this is advantageous in discharging generated water.

In the embodiment, the bumps are in contact with one of the pair of separators. This can suppress deformation of the frame compared to the case in which the bumps are not in contact with any of the pair of separators. Therefore, even when the spacing between the separators of the single cell is narrow, an increase in pressure loss can be suppressed regardless of whether the frame is deformed.

In the embodiment, the opened end face of the frame manifold protrudes inward to the separator manifold portions with respect to the opened end faces of the separator manifolds. Therefore, even when the spacing between the pair of separators of the single cell is narrow, a short circuit between the pair of separators can be prevented regardless of whether the frame is deformed.

In the embodiment, the bumps have an approximately circular shape in a plan view. This is advantageous in securing the gas channel even when the components are slightly misaligned in assembling the fuel cell single cell. Further, this makes the frame less deformable and is therefore advantageous in securing the gas channel since there is a bent portion near the opened end face.

Second Embodiment

Figure 8:
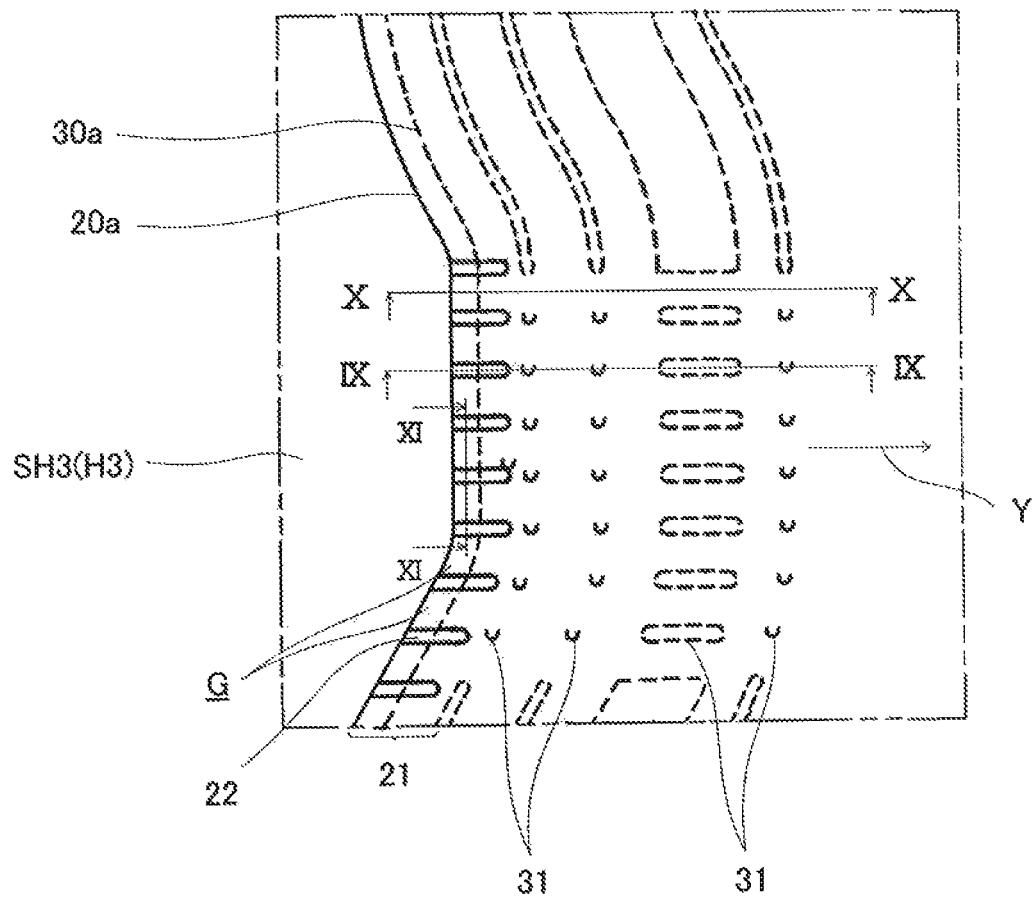
FIG. 8 is a plan view of a main part of a fuel cell single cell according to a second embodiment, which is a component of a fuel cell module.
Figure 9:
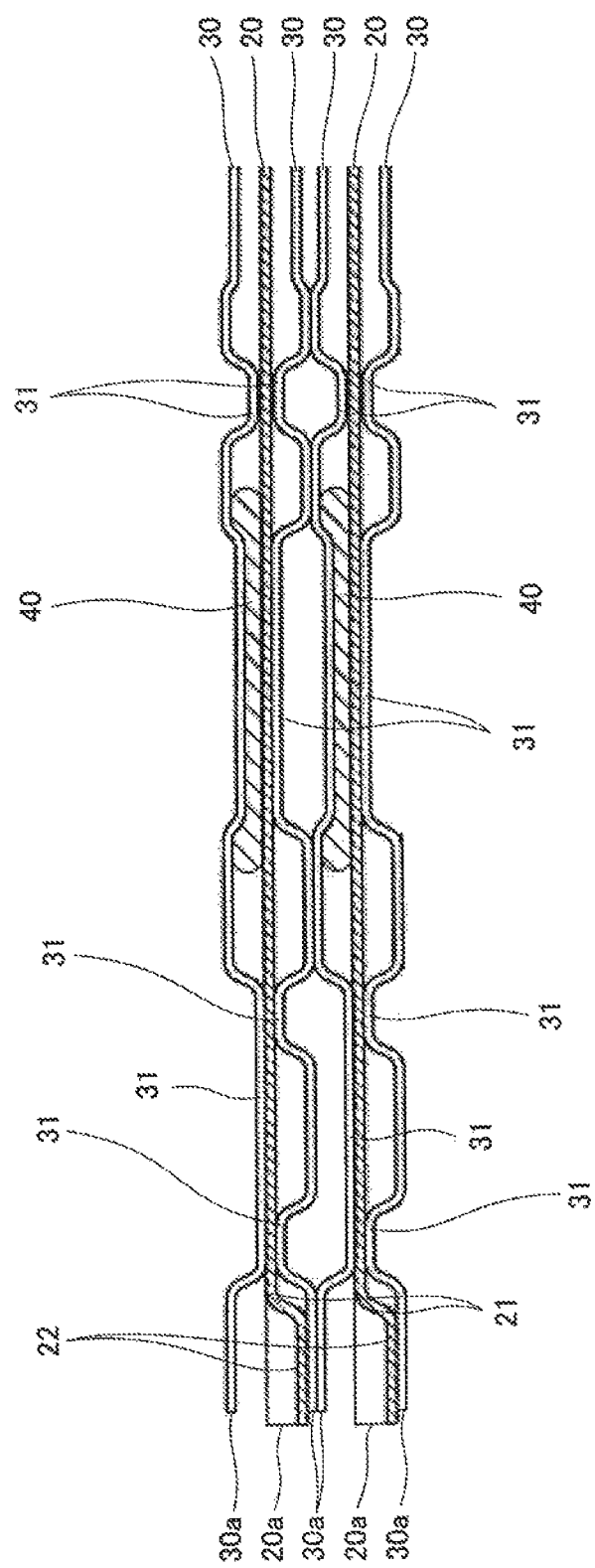
FIG. 9 is a cross-sectional view of the main part of the fuel cell single cell according to the second embodiment.
Figure 10:
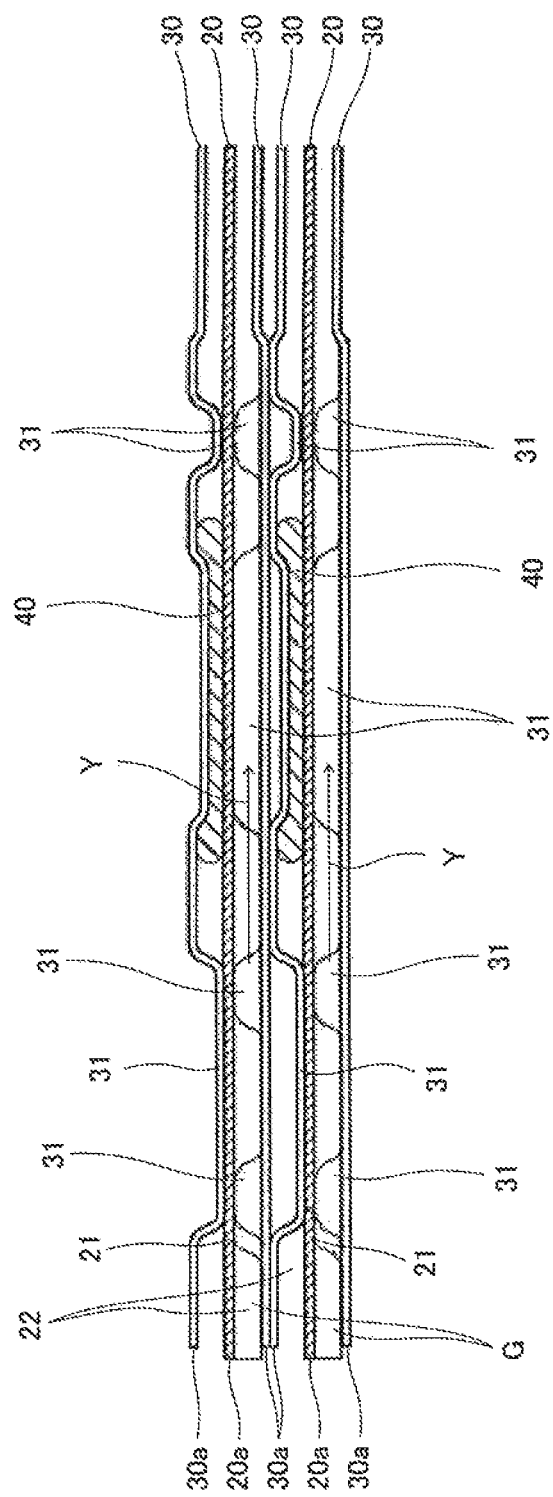
FIG. 10 is another cross-sectional view of the main part of the fuel cell single cell according to the second embodiment.
Figure 11:
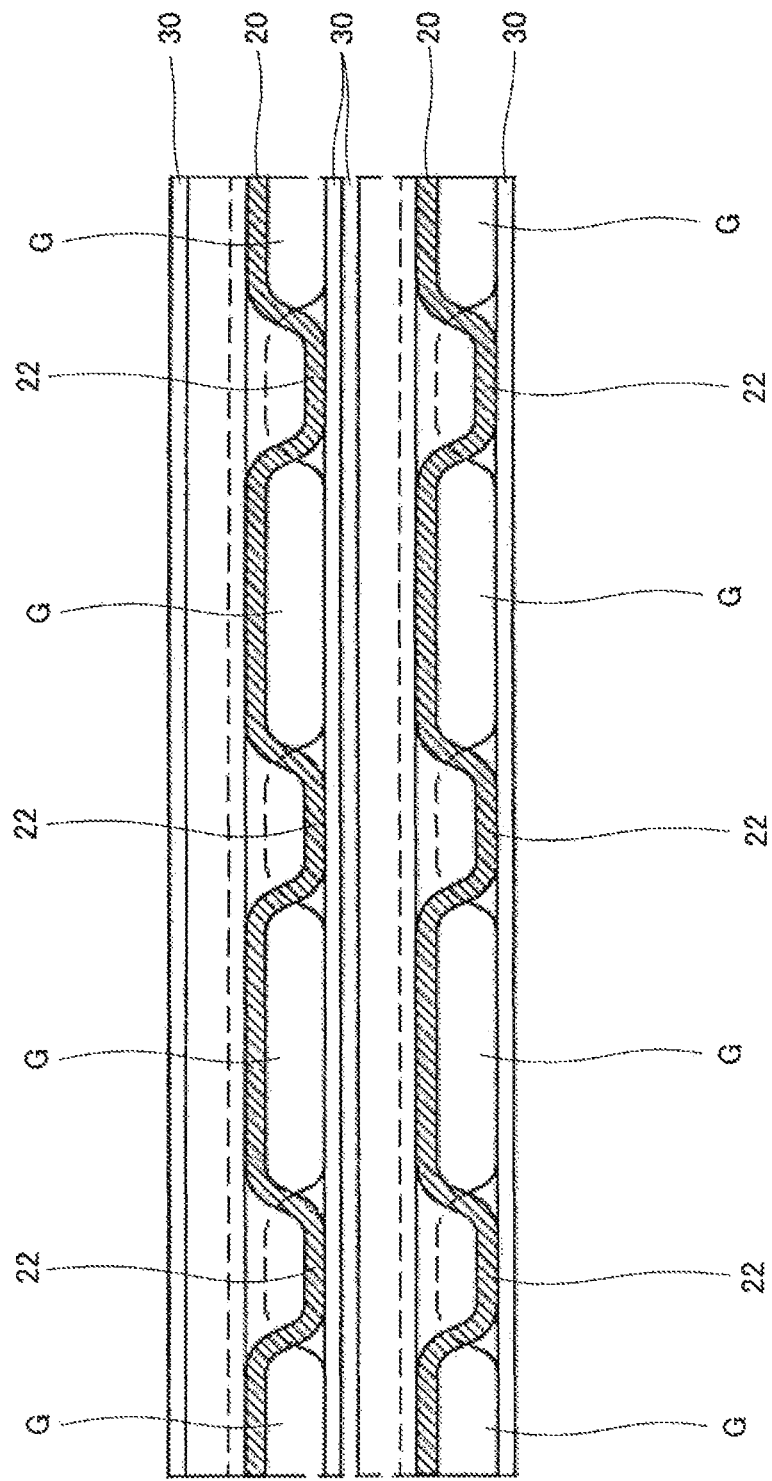
FIG. 11 is yet another cross-sectional view of the main part of the fuel cell single cell according to the second embodiment.

FIG. 8 is a plan view of a main part of a fuel cell single cell according to a second embodiment of the present invention, which is a component of a fuel cell module. That is, FIG. 8 is a plan view of the same part as the part of the fuel cell single cell enclosed by the line Z in FIG. 3A. However, the upper separator of the pair of separators at the top of the fuel cell module is omitted. Further, the lower separator of the pair of separators at the top of the fuel cell module is illustrated by a dashed line. FIG. 9 is a cross-sectional view of the main part of the fuel cell single cell according to the second embodiment. That is, FIG. 9 is a cross-sectional view of the fuel cell single cell in FIG. 8 taken along the line IX-IX. However, FIG. 9 illustrates two fuel cell single cells that are stacked. FIG. 10 is another cross-sectional view of the main part of the fuel cell single cell according to the second embodiment. That is, FIG. 10 is a cross-sectional view of the fuel cell single cell in FIG. 8 taken along the line X-X. FIG. 11 is yet another cross-sectional view of the main part of the fuel cell single cell in FIG. 8 according to the second embodiment. That is, FIG. 11 is a cross-sectional view of the fuel cell single cell in FIG. 8 taken along the line XI-XI. The same reference signs are denoted to the same components as those of the above-described embodiment, and the description thereof is omitted.

As illustrated in FIG. 8 to FIG. 11, this embodiment is different from the first embodiment in that the bumps 22 have a linear shape parallel to the flow direction Y of gas. That is, the illustrated bumps 22 have an approximately rectangular shape in a plan view, the long sides of which extend in the gas flow direction to reach the opened end face. For example, such bumps 22 can also be formed by embossing. Also in this case, such bumps 22 form recesses which protrude towards the other of the pair of separators 30, 30.

In the embodiment, a gas flowing portion is constituted by the bumps disposed at the extended portion. This can secure the gas channel even when the frame is deformed. Therefore, even when the spacing between the separators of the single cell is narrow, an increase in pressure loss can be suppressed regardless of whether the frame is deformed.

In the embodiment, the bumps are aligned with the protrusions in the gas flow direction. This can secure the gas channel that causes less pressure loss compared to the case in which the bumps are not aligned with the protrusions. Therefore, even when the spacing between the pair of separators of the single cell is narrow, an increase in pressure loss can be suppressed regardless of whether the frame is deformed. Further, this is also advantageous in discharging generated water.

In the embodiment, the bumps are in contact with one of the pair of separators. This can suppress deformation of the frame compared to the case in which the bumps are not in contact with any of the pair of separators. Therefore, even when the spacing between the pair of separators of the single cell is narrow, an increase in pressure loss can be suppressed regardless of whether the frame is deformed.

In the embodiment, the opened end face of a frame manifold protrudes inward to separator manifold portions with respect to the opened end faces of the separator manifolds. Therefore, even when the spacing between the pair of separators of the single cell is narrow, a short circuit between the pair of separators can be prevented regardless of whether the frame is deformed.

In the embodiment, the bumps have a linear shape parallel to the flow direction of gas. Specifically, the bumps have an approximately rectangular shape in a plan view, the long sides of which extend in the gas flow direction to reach the opened end face. This makes the frame less deformable and is therefore advantageous in securing the gas channel. This is also advantageous in aligning gas flow. Therefore, even when the spacing between the pair of separators of the single cell is narrow, an increase in pressure loss can be suppressed regardless of whether the frame is deformed.

Third Embodiment

Figure 12:
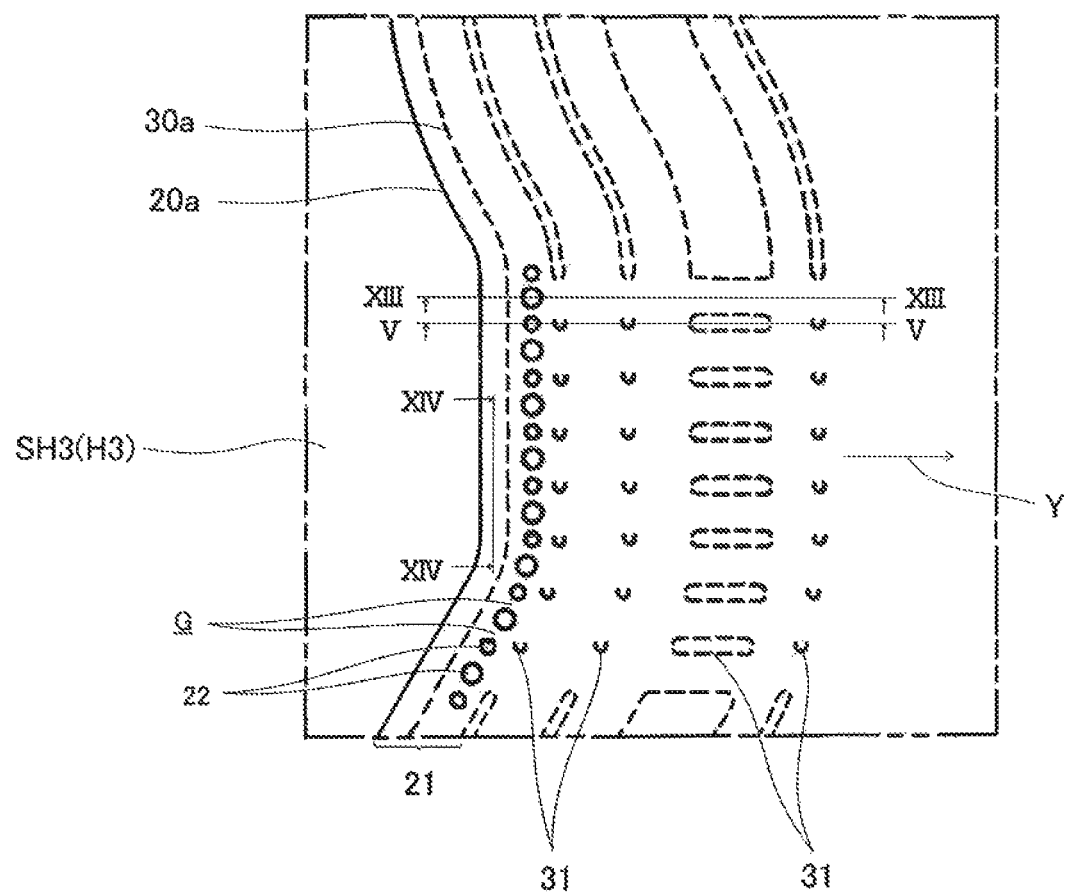
FIG. 12 is a plan view of a main part of a fuel cell single cell according to a third embodiment, which is a component of a fuel cell module.
Figure 13:
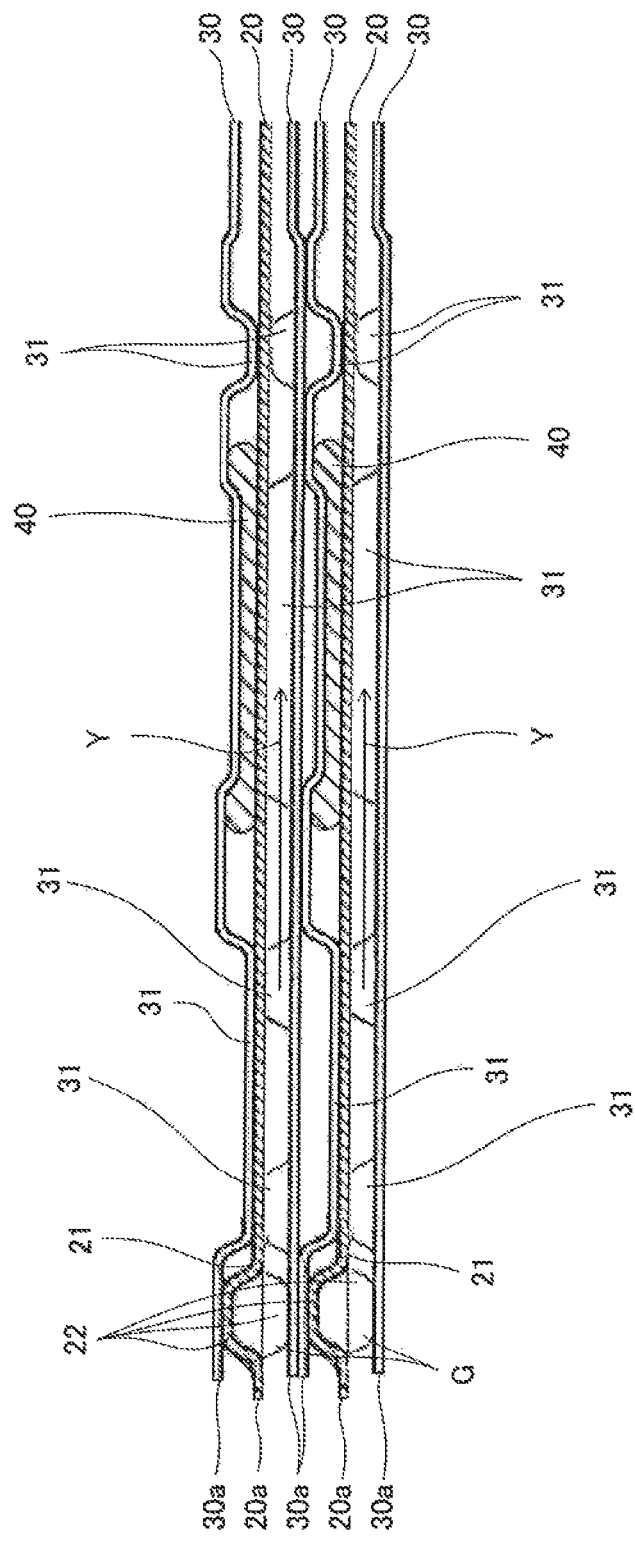
FIG. 13 is a cross-sectional view of the main part of the fuel cell single cell according to the third embodiment.
Figure 14:
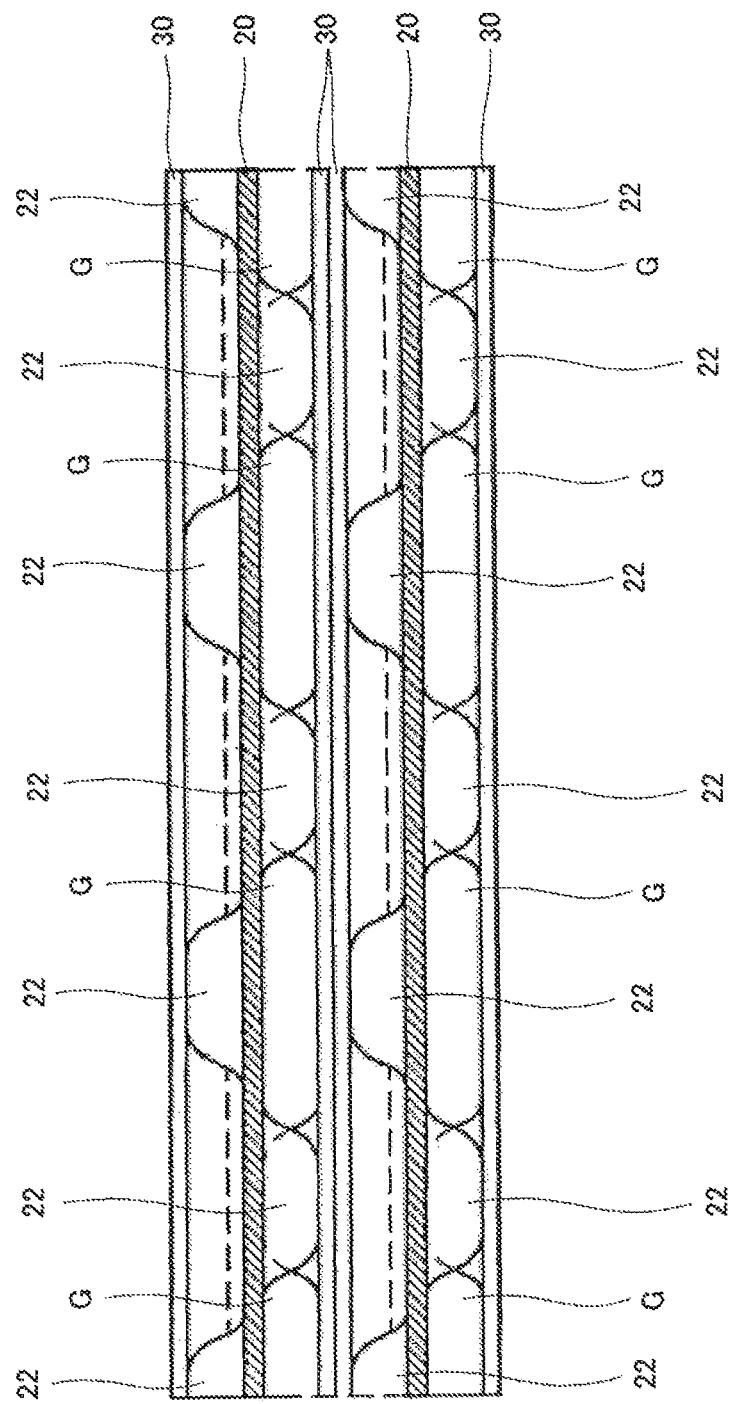
FIG. 14 is another cross-sectional view of the main part of the fuel cell single cell according to the third embodiment.

FIG. 12 is a plan view of a main part of a fuel cell single cell according to a third embodiment, which is a component of a fuel cell module. That is, FIG. 12 is a plan view of the same part as the part of the fuel cell single cell in FIG. 3A enclosed by the line Z. However, the upper separator of the pair of separators at the top of the fuel cell module is omitted. Further, the lower separator of the pair of separators at the top of the fuel cell module is illustrated by a dashed line. FIG. 13 is a cross-sectional view of the main part of the fuel cell single cell according to the third embodiment. That is, FIG. 13 is a cross-sectional view of the fuel cell single cell in FIG. 12 taken along the line XIII-XIII. However, FIG. 13 illustrates two fuel cell single cells that are stacked. FIG. 14 is another cross-sectional view of the main part of the fuel cell single cell according to the third embodiment. That is, FIG. 14 is a cross-sectional view of the fuel cell single cell in FIG. 12 taken along the line XVI-XVI. The cross-sectional view taken along the line V-V of FIG. 12 is the same as that of FIG. 5. The same reference signs are denoted to the same components as those in the above-described embodiments, and the description thereof is omitted.

As illustrated in FIG. 12 to FIG. 14, this embodiment is different from the first embodiment in that bumps 22 are in contact with both of the pair of separators 30, 30.

In the embodiment, gas flowing portions are constituted by bumps disposed in an extended portion. This can secure gas channels even when a frame is deformed. Therefore, even when the spacing between the pair of separators of the single cell is narrow, an increase in pressure loss can be suppressed regardless of whether the frame is deformed.

In the embodiment, the bumps are aligned with protrusions in a gas flow direction. This can secure gas channels that cause less pressure loss compared to the case in which the bumps are not aligned with the protrusions. Therefore, even when the spacing between the pair of separators of the single cell is narrow, an increase in pressure loss can be suppressed regardless of whether the frame is deformed. Further, this is also advantageous in discharging generated water.

In the embodiment, the bumps are in contact with both of the pair of separators. This can prevent deformation of the frame compared to the case in which the bumps are in contact with one of the pair of separators. Therefore, even when the spacing between the pair of separators of the single cell is narrow, an increase in pressure loss can be suppressed regardless of whether the frame is deformed.

In the embodiment, the opened end face of a frame manifold protrudes inward to separator manifold portions with respect to the opened end faces of the separator manifolds. Therefore, even when the spacing between the pair of separators of the single cell is narrow, a short circuit between the separators can be prevented regardless of whether the frame is deformed.

In the embodiment, the bumps have an approximately circular shape in a plan view. This is advantageous in securing the gas channels even when the components are slightly misaligned in assembling the fuel cell single cell. Further, this makes the frame less deformable and is therefore advantageous in securing the gas channels since there is a bent portion near the opened end face.

Fourth Embodiment

Figure 15:
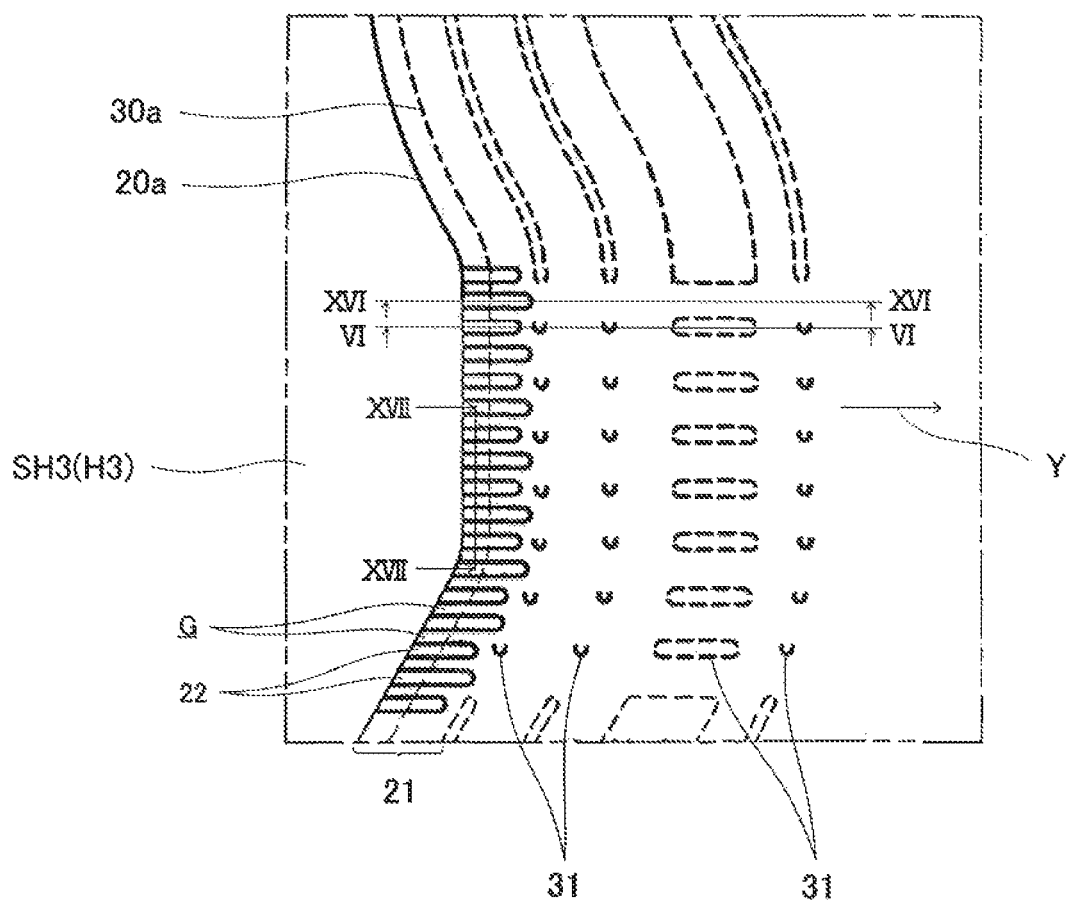
FIG. 15 is a plan view of a main part of a fuel cell single cell according to a fourth embodiment, which is a component of a fuel cell module.
Figure 16:
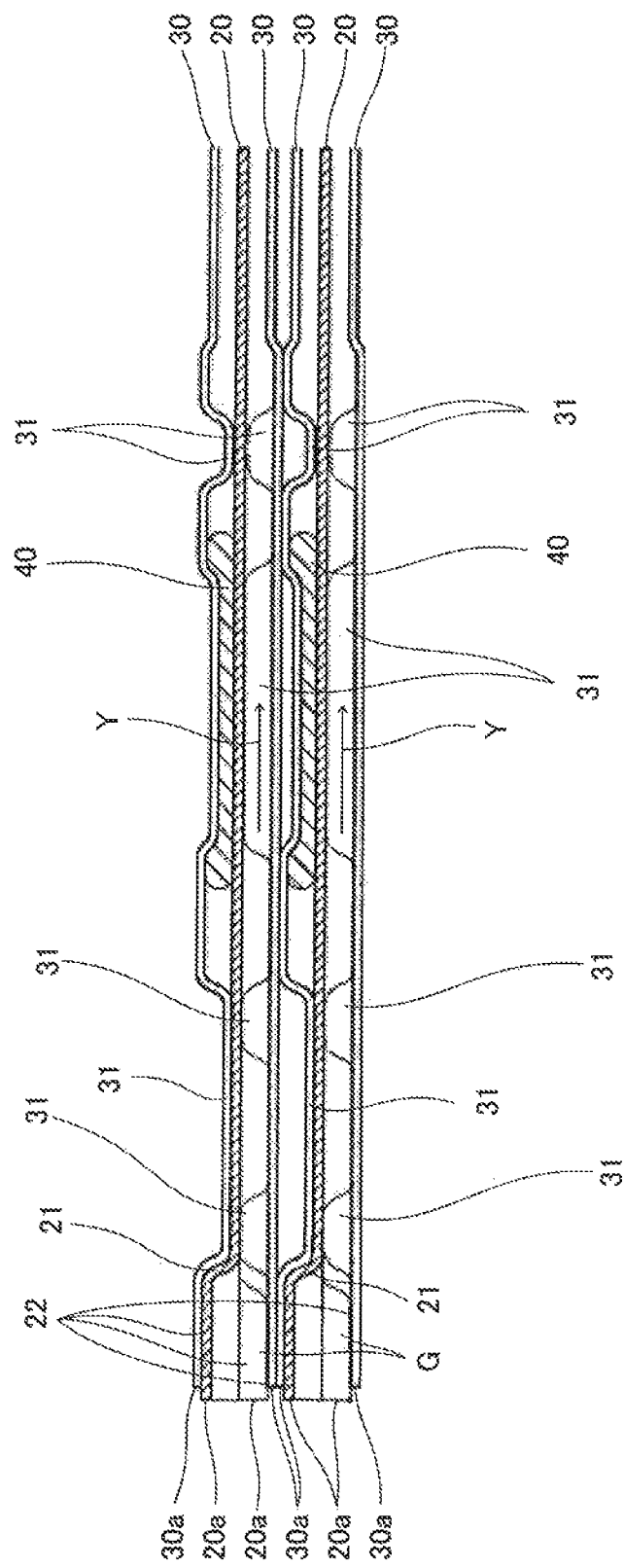
FIG. 16 is a cross-sectional view of the main part of the fuel cell single cell according to the fourth embodiment.
Figure 17:
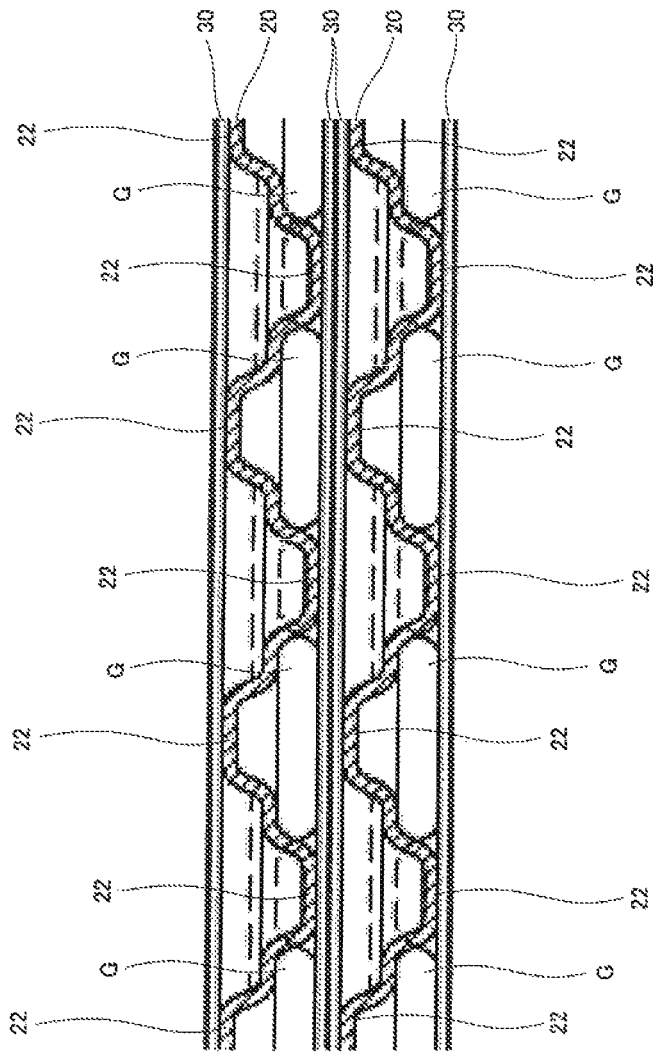
FIG. 17 is another cross-sectional view of the main part of the fuel cell single cell according to the fourth embodiment.

FIG. 15 is a plan view of a main part of a fuel cell single cell according to a fourth embodiment, which is a component of a fuel cell module. That is, FIG. 15 is a plan view of the same part as the part enclosed by the line Z of the fuel cell single cell in FIG. 3A. However, the upper separator of the pair of separators at the top of the fuel cell module is omitted. Further, the lower separator of the pair of separators at the top of the fuel cell module is illustrated by a dashed line. FIG. 16 is a cross-sectional view of the main part of the fuel cell single cell according to the fourth embodiment. That is, FIG. 16 is a cross-sectional view of the fuel cell single cell in FIG. 15 taken along the line XVI-XVI. However, FIG. 16 illustrates two fuel cell single cells that are stacked. FIG. 17 is another cross-sectional view of the main part of the fuel cell single cell according to the fourth embodiment. That is, FIG. 17 is a cross-sectional view of the fuel cell single cell in FIG. 15 taken along the line XVII-XVII. The cross-sectional view of the fuel cell of FIG. 17 taken along the line IX-IX is the same as that of FIG. 9. The same reference signs are denoted to the same components as those of the above-described embodiments, and the description thereof is omitted.

As illustrated in FIG. 15 to FIG. 17, this embodiment is different from the second embodiment in that bumps 22 are in contact with both of the pair of separators 30, 30.

In the embodiment, the gas flowing portions are constituted by the bumps that are disposed in an extended portion. This can secure gas channels even when a frame is deformed. Therefore, even when the spacing between the pair of separators of the single cell is narrow, an increase in pressure loss can be suppressed regardless of whether the frame is deformed.

In the embodiment, the bumps are aligned with protrusions in a gas flow direction. This can secure the gas channels that cause less pressure loss compared to the case in which the bumps are not aligned with the protrusions. Therefore, even when the spacing between the pair of separators of the single cell is narrow, an increase in pressure loss can be suppressed regardless of whether the frame is deformed. Further, this is also advantageous in discharging generated water.

In the embodiment, the bumps are in contact with both of the pair of separators. This can prevent deformation of the frame compared to the case in which the bumps are in contact with one of the pair of separators. Therefore, even when the spacing between the pair of separators of the single cell is narrow, an increase in pressure loss can be suppressed regardless of whether the frame is deformed.

In the embodiment, the opened end face of a frame manifold protrudes inward to a separator manifold portion with respect to the opened end face of the separator manifold. Therefore, even when the spacing between the pair of separators of the single cell is narrow, a short circuit between the separators can be prevented regardless of whether the frame is deformed.

In the embodiment, the bumps have a linear shape parallel to the flow direction of gas. Specifically, the bumps have an approximately rectangular shape with the long sides that extend in the gas flow direction to reach the opened end face. This makes the frame less deformable and is therefore advantageous in securing the gas channel. This is also advantageous in aligning gas flow. Therefore, even when the spacing between the pair of separators of the single cell is narrow, an increase in pressure loss can be suppressed regardless of whether the frame is deformed.

While the present invention is described with some embodiments, the present invention is not limited to these embodiments, and a variety of changes can be made within the features of the present invention.

For example, the above-described embodiments illustrate examples in which an anode gas supplying site is the predetermined position of the frame in which the gas flowing portion with the bumps is formed. However, the present invention is not limited thereto. That is, the present invention is applicable to a cathode gas supplying site in addition to or instead of the anode gas supplying site. In addition, the present invention is also applicable to an anode gas discharging site and a cathode gas discharging site.

REFERENCE SIGNS LIST

FS Fuel cell stack
C Fuel cell single cell
M Fuel cell module
P Sealing plate
F Gas channel portion
G Gas flowing portion
H1 to H6 Manifold portion
FH1 to FH6 Frame manifold portion
SH1 to SH6 Separator manifold portion
10 Framed membrane electrode assembly
12 Membrane electrode assembly
20 Frame
20a Opened end face
21 Extended portion
22 Bump
30 Separator
30a Opened end face
31 Protrusion
40 Sealing member
56A, 56B End plate
57A, 57B Fastening plate
58A, 58B Reinforcing plate

The invention claimed is:

1. A single cell structure for a fuel cell, comprising:
a framed membrane electrode assembly comprising a membrane electrode assembly and a frame supporting an outer periphery of the membrane electrode assembly;
a pair of separators disposed on both sides of the framed membrane electrode assembly;
a gas channel portion which is formed between at least one of the pair of separators and the membrane electrode assembly, and to which gas is supplied;
a manifold portion having a hole that penetrates the frame and the pair of separators in a stacking direction;
protrusions, which are part of the pair of separators, that protrude from both of the pair of separators toward the framed membrane electrode assembly to directly contact and directly hold both sides of the frame;
an extended portion of the frame that extends toward the hole of the manifold portion beyond the protrusions; and
a gas flowing portion that is formed at the extended portion to supply the gas from the manifold portion to the gas channel portion,
wherein the gas flowing portion is formed between a plurality of bumps that are part of the extended portion of the frame.

2. The single cell structure for the fuel cell according to claim 1, wherein at least one of the plurality of bumps has a linear shape parallel to a flow direction of the gas.

3. The single cell structure for the fuel cell according to claim 1, wherein at least one of the plurality of bumps is aligned with at least one of the protrusions in a flow direction of the gas.

4. The single cell structure for the fuel cell according to claim 2, wherein at least one of the plurality of bumps is aligned with at least one of the protrusions in the flow direction of the gas.

5. The single cell structure for the fuel cell according to claim 1, wherein at least one of the plurality of bumps is in contact with at least one separator of the pair of separators.

6. The single cell structure for the fuel cell according to claim 2, wherein at least one of the plurality of bumps is in contact with at least one separator of the pair of separators.

7. The single cell structure for the fuel cell according to claim 3, wherein at least one of the plurality of bumps is in contact with at least one separator of the pair of separators.

8. The single cell structure for the fuel cell according to claim 4, wherein at least one of the plurality of bumps is in contact with at least one separator of the pair of separators.

9. The single cell structure for the fuel cell according to claim 1, wherein at least one of the pair of separators includes an opened end face of the separator at the manifold portion and the frame includes an opened end face of the frame at the manifold portion,
wherein the opened end face of the frame protrudes beyond the opened end face of the separator toward the hole of the manifold portion.

* * * * *